(12) United States Patent
Han et al.

(10) Patent No.: US 11,063,751 B2
(45) Date of Patent: Jul. 13, 2021

(54) COMMUNICATION SYSTEM

(71) Applicant: LG ELECTRONICS INC., Seoul (KR)

(72) Inventors: Kyusuk Han, Seoul (KR); Hyobin Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 16/332,535

(22) PCT Filed: Sep. 12, 2017

(86) PCT No.: PCT/KR2017/009963
§ 371 (c)(1),
(2) Date: Mar. 12, 2019

(87) PCT Pub. No.: WO2018/048279
PCT Pub. Date: Mar. 15, 2018

(65) Prior Publication Data
US 2019/0215153 A1    Jul. 11, 2019

Related U.S. Application Data

(60) Provisional application No. 62/393,286, filed on Sep. 12, 2016.

(51) Int. Cl.
*H04L 9/08* (2006.01)
*H04L 9/32* (2006.01)
(Continued)

(52) U.S. Cl.
CPC ......... *H04L 9/0833* (2013.01); *H04L 9/0844* (2013.01); *H04L 9/32* (2013.01);
(Continued)

(58) Field of Classification Search
CPC ......... H04L 9/0833; H04L 9/32; H04L 12/40; H04L 29/06; H04L 9/0844; H04L 9/3255; H04L 63/083; H04L 63/12
(Continued)

(56) References Cited

U.S. PATENT DOCUMENTS

2015/0270968 A1    9/2015  Nairn et al.
2015/0365389 A1*  12/2015  Zhang ............... H04L 63/0884
                                                              713/171

FOREIGN PATENT DOCUMENTS

EP    3128699    *  8/2015  ............ H04L 12/28
EP    3128699       2/2017
(Continued)

OTHER PUBLICATIONS

Extended European Search Report in European Appln. No. 17849163.5, dated Apr. 1, 2020, 9 pages.
(Continued)

*Primary Examiner* — Kambiz Zand
*Assistant Examiner* — Aubrey H Wyszynski
(74) *Attorney, Agent, or Firm* — Fish & Richardson P.C.

(57) ABSTRACT

A communication system between a plurality of in-vehicle electronic devices protected using a symmetric key method is disclosed. The communication system includes a sender configured to transmit a message including a cyclic authentication code and a group authentication code, and a plurality of receivers configured to separately verify the message based on the cyclic authentication code and the group authentication code at a preset order.

11 Claims, 12 Drawing Sheets

(51) Int. Cl.
*H04L 12/40* (2006.01)
*H04L 29/06* (2006.01)
(52) U.S. Cl.
CPC ............ *H04L 9/3255* (2013.01); *H04L 12/40* (2013.01); *H04L 29/06* (2013.01)
(58) Field of Classification Search
USPC ........................................................ 380/278
See application file for complete search history.

(56) References Cited

FOREIGN PATENT DOCUMENTS

| JP | 2016116075 | 6/2016 |
| KR | 1020150024117 | 4/2015 |
| WO | WO2015151418 | 10/2015 |
| WO | WO2015170452 | 11/2015 |

OTHER PUBLICATIONS

PCT International Search Report in International Appln. No. PCT/KR2017/009963, dated Jan. 9, 2018, 6 pages (with English translation).

\* cited by examiner

COMMUNICATION SYSTEM

CROSS-REFERENCE TO RELATED APPLICATIONS

This application is a National Stage application under 35 U.S.C. § 371 of International Application No. PCT/KR2017/009963, filed on Sep. 12, 2017, which claims the benefit of U.S. Provisional Application No. 62/393,286, filed on Sep. 12, 2016. The disclosures of the prior applications are incorporated by reference in their entirety.

BACKGROUND OF THE INVENTION

1. Field of the Invention

The present invention relates to an in-vehicle communication system.

2. Description of the Related Art

A vehicle refers to a device that carries a passenger in a passenger-intended direction. A car is a major example of the vehicle.

A vehicular electrical component includes electronic control units (ECUs) and an in-vehicle network (IVN) connected thereto. The IVN may include a controller area network (CAN), FlexRay, a local interconnect network (LIN), or the like.

The ECU may be used for various purposes such as engine control, infortainment, window adjustment, and wiper adjustment. A high-performance ECU is mainly used for engine control or infortainment, but an ECU for wiper or window adjustment is provided with relatively low performance.

Use of a hardware security module (HSM) has been discussed as a hardware function in order to provide a security function, and specification of a security function with three grades is designed by the EVITA project: light EVITA, medium EVITA, and full EVITA grade.

There among, ECC computing is provided as a public key infrastructure (PKI) only in the Full EVITA grade.

In addition, most ECUs use secure hardware extension (SHE) at the light EVITA or the same standard.

Accordingly, there is a need to consider supporting of a security function based on symmetric key-based cryptography other than a method using the PKI.

DISCLOSURE

Technical Problem

Therefore, the present invention has been made in view of the above problems, and it is an object of the present invention to provide a communication system having a security function for preventing insider attack while using a relatively small amount of data in a vehicle.

It is to be understood that both the foregoing general description and the following detailed description of the present invention are exemplary and explanatory and are intended to provide further explanation of the invention as claimed.

Technical Solution

In accordance with the present invention, the above and other objects can be accomplished by the provision of a communication system between a plurality of in-vehicle electronic devices protected using a symmetric key method, the communication system including a sender configured to transmit a message including a cyclic authentication code and a group authentication code, and a plurality of receivers configured to separately verify the message based on the cyclic authentication code and the group authentication code at a preset order.

Details of other embodiments are included in detailed descriptions and drawings.

Advantageous Effects

As is apparent from the foregoing description, the embodiments of the present invention have the following one or more effects.

First, it is possible to effectively defend insider attack while using a small amount of data.

Second, it is possible to verify a message and a sender without time delay.

Third, it is possible to prevent hacking without establishment of a separate system.

It will be appreciated by persons skilled in the art that that the effects that could be achieved with the present invention are not limited to what has been particularly described hereinabove and other advantages of the present invention will be more clearly understood from the following claims.

DETAILED DESCRIPTION OF THE PREFERRED EMBODIMENTS

Figure 1:
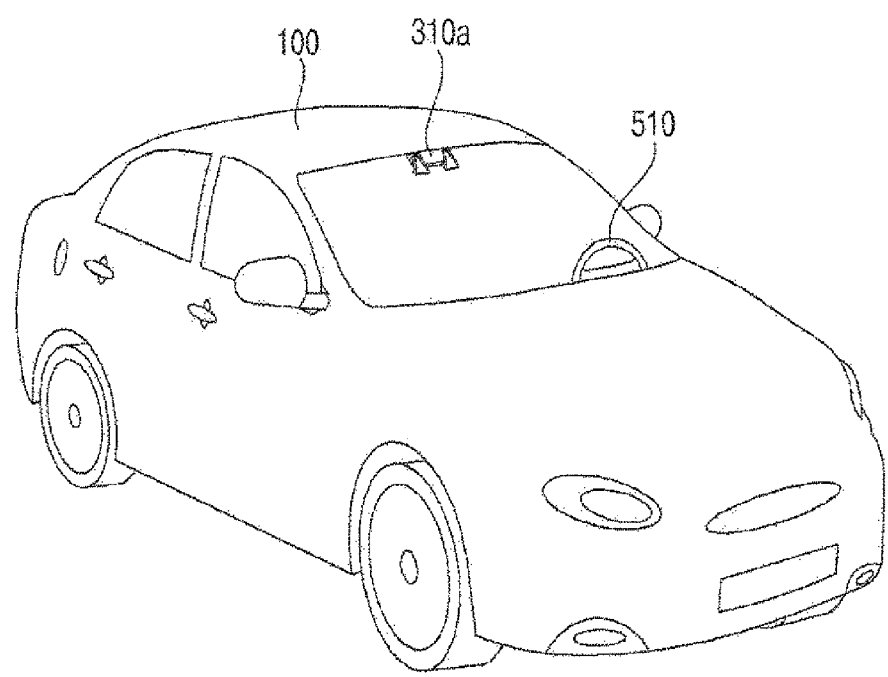
FIG. 1 shows the exterior of a vehicle according to an embodiment of the present invention.
Figure 1:
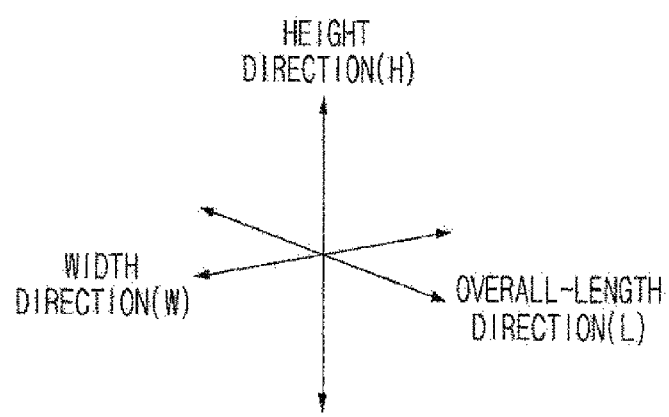

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" are intended to include the plural forms as well, unless context clearly indicates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The term "vehicle" employed in this specification may include an automobile and a motorcycle. Hereinafter, description will be given mainly focusing on an automobile.

The vehicle described in this specification may include a vehicle equipped with an internal combustion engine as a power source, a hybrid vehicle equipped with both an engine and an electric motor as a power source, and an electric vehicle equipped with an electric motor as a power source.

In the description below, the left side of the vehicle means the left side with respect to the travel direction of the vehicle and the right side of the vehicle means the right side with respect to the travel direction of the vehicle.

FIG. 1 shows the exterior of a vehicle according to an embodiment of the present invention.

Figure 2:
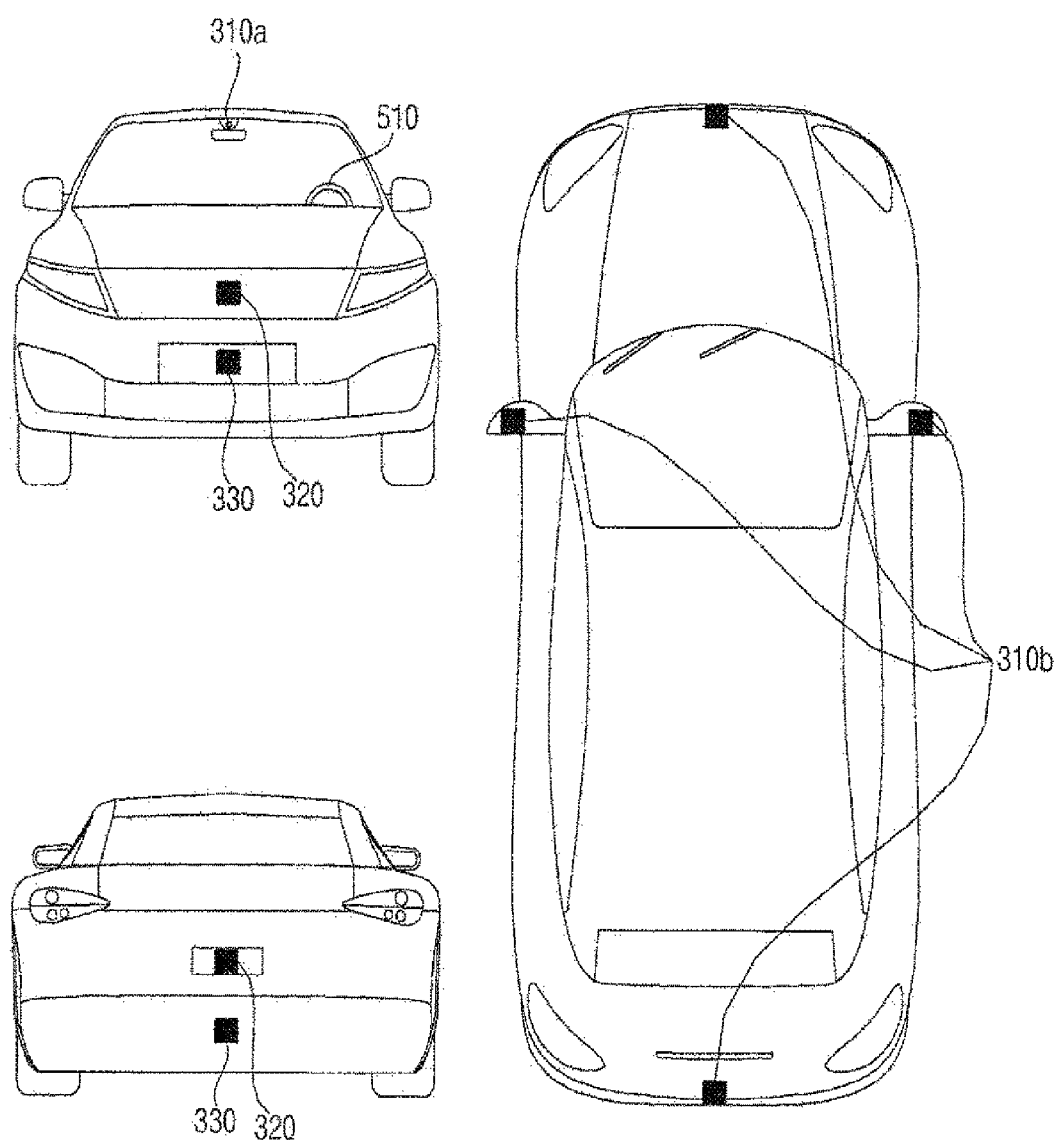
FIG. 2 is a view illustrating exteriors of a vehicle, seen at various angles from the outside of the vehicle according to an embodiment of the present invention.

FIG. 2 is a view illustrating exteriors of a vehicle, seen at various angles from the outside of the vehicle according to an embodiment of the present invention.

Figure 3:
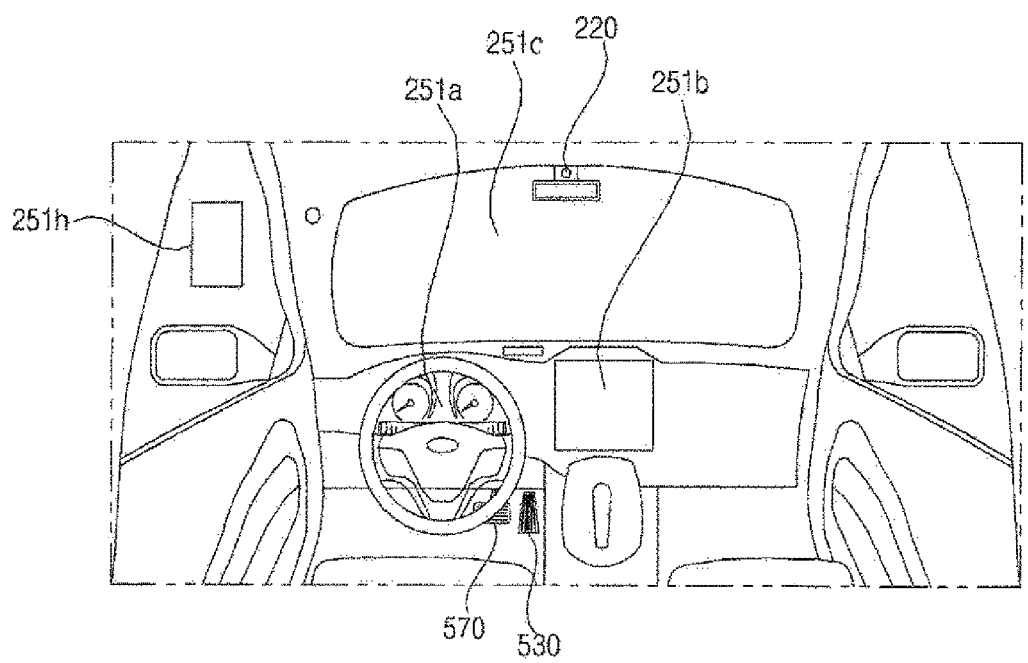
FIGS. 3 and 4 are views illustrating the interior of a vehicle according to an embodiment of the present invention.
Figure 4:
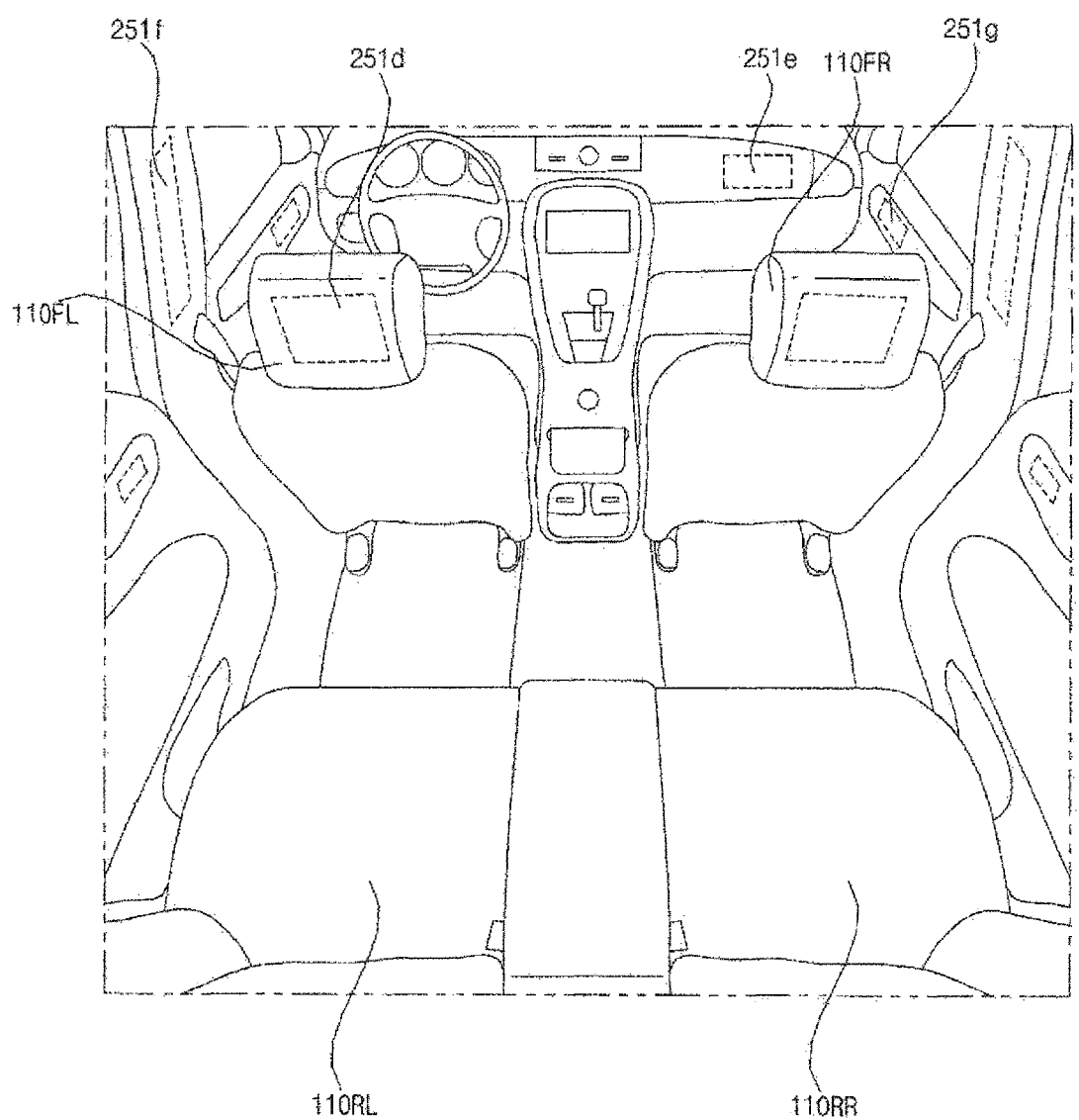

FIGS. 3 and 4 are views illustrating the interior of a vehicle according to an embodiment of the present invention.

Figure 5:
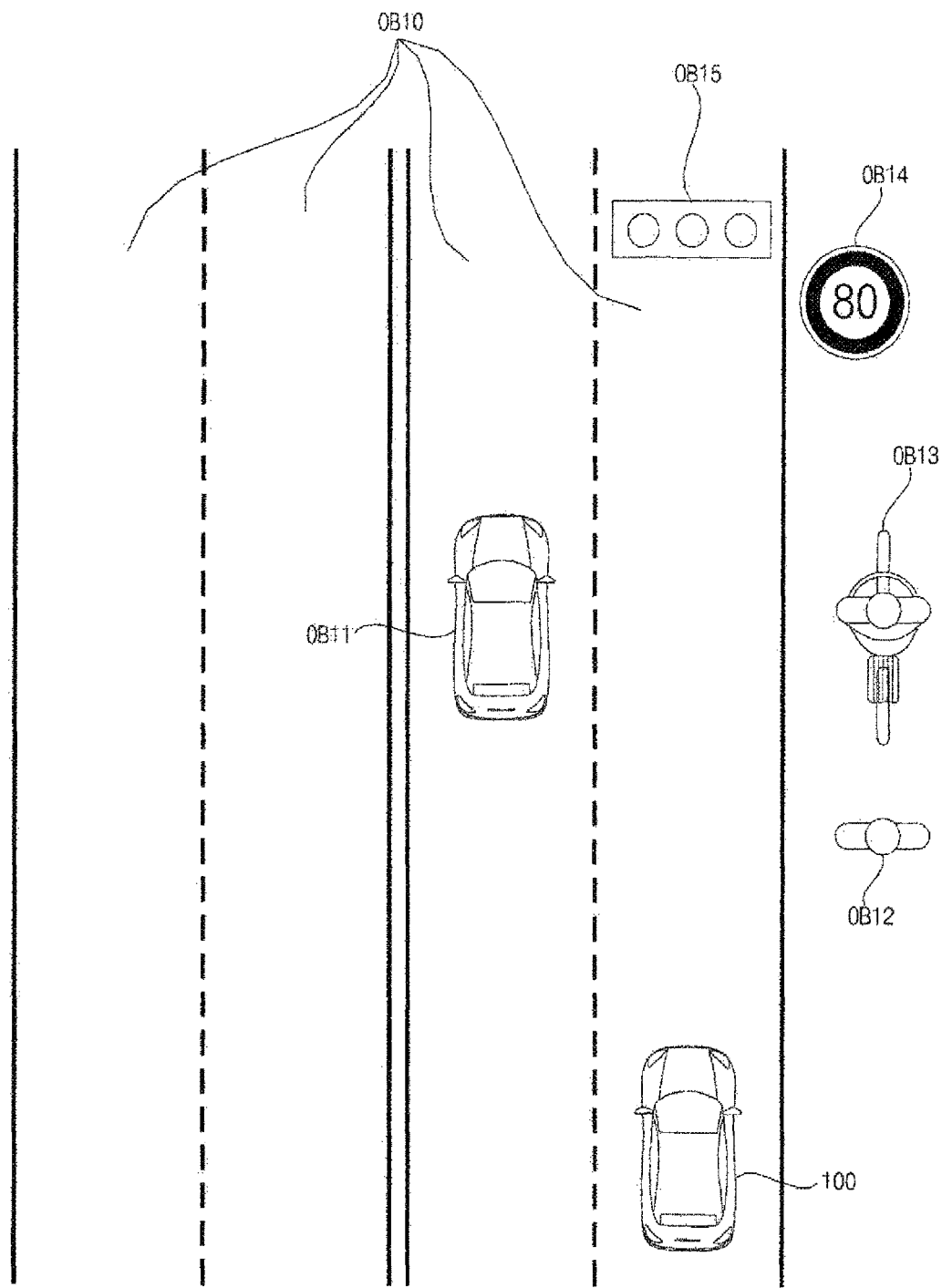
FIGS. 5 and 6 are views referred to for describing objects according to an embodiment of the present invention.
Figure 6:
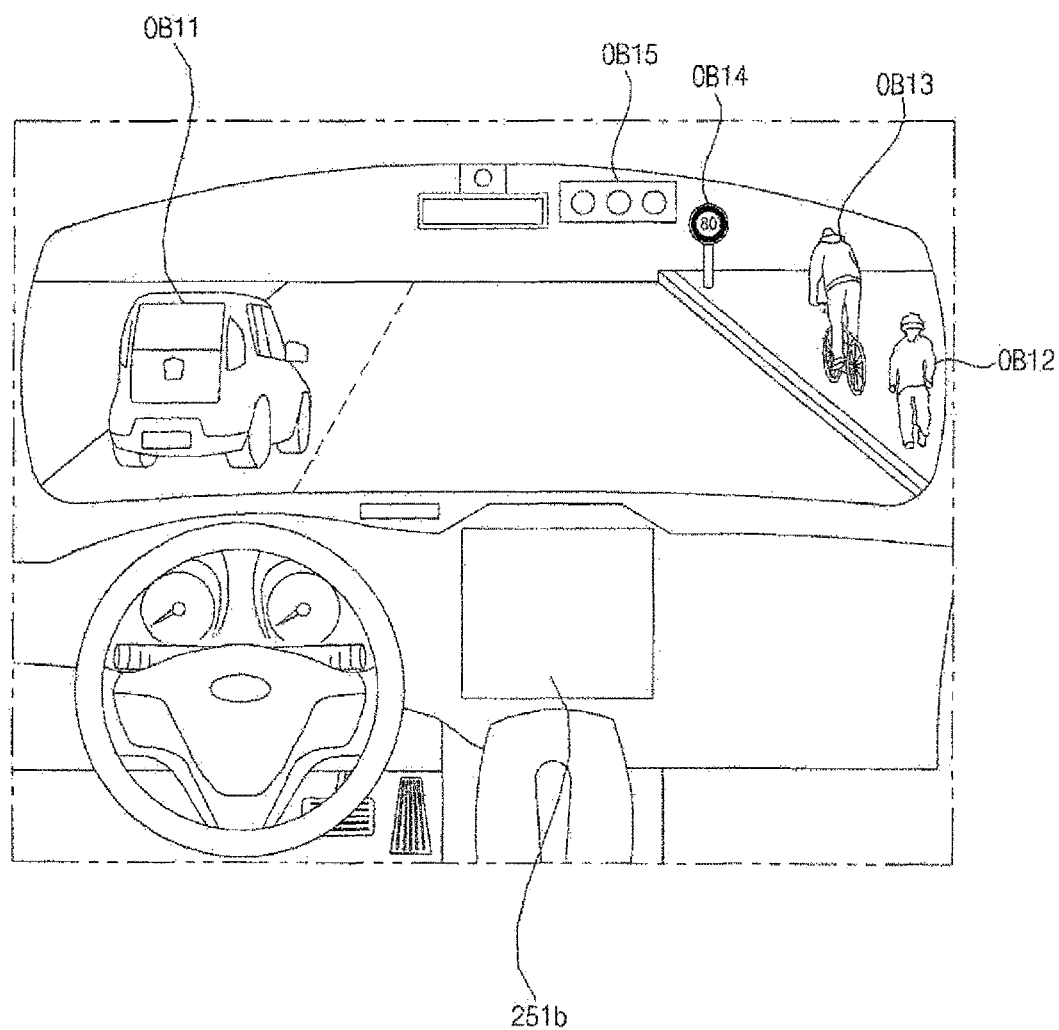

FIGS. 5 and 6 are views referred to for describing objects according to an embodiment of the present invention.

Figure 7:
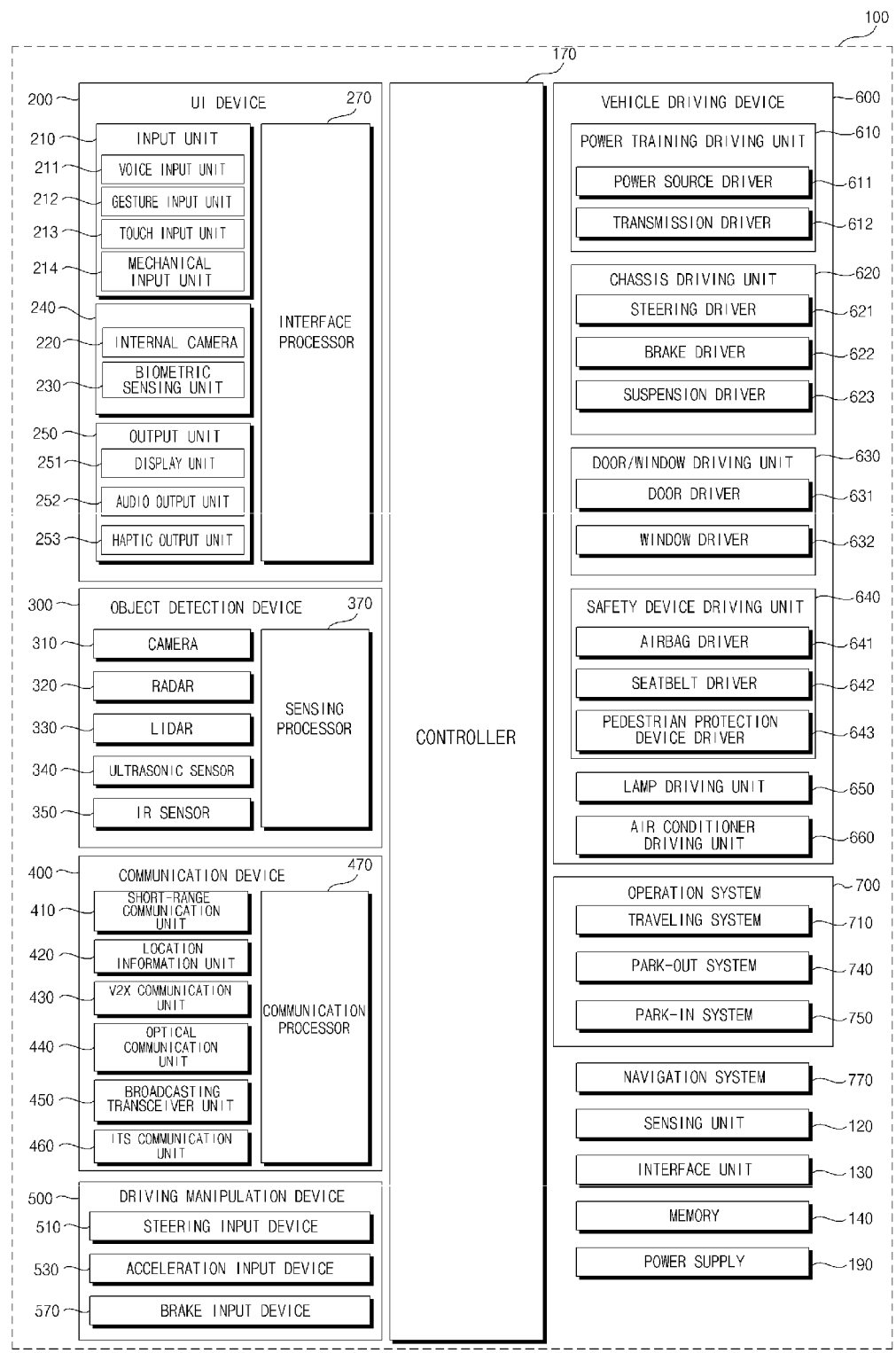
FIG. 7 is a block diagram of a vehicle according to an embodiment of the present invention

FIG. 7 is a block diagram of a vehicle according to an embodiment of the present invention.

Referring to FIGS. 1 to 7, a vehicle 100 may include wheels rotated by a power source, and a steering input device 510 for controlling a travel direction of the vehicle 100.

The vehicle 100 may be an autonomous vehicle.

The vehicle 100 may switch to an autonomous driving mode or a manual mode according to a user input.

For example, the vehicle 100 may switch from the manual mode to the autonomous driving mode or from the autonomous driving mode to the manual mode, based on a user input received through a User Interface (UI) device 200.

The vehicle 100 may switch to the autonomous driving mode or the manual mode based on traveling situation information.

The traveling situation information may include at least one of information about objects outside the vehicle, navigation information, or vehicle state information.

For example, the vehicle 100 may switch from the manual mode to the autonomous driving mode or from the autonomous driving mode to the manual mode, based on traveling situation information generated from an object detection device 300.

For example, the vehicle 100 may switch from the manual mode to the autonomous driving mode or from the autonomous driving mode to the manual mode, based on traveling situation information generated from a communication device 400.

The vehicle 100 may switch from the manual mode to the autonomous driving mode or from the autonomous driving mode to the manual mode, based on information, data, or a signal provided from an external device.

If the vehicle 100 travels in the autonomous driving mode, the autonomous vehicle 100 may be operated based on an operation system 700.

For example, the autonomous vehicle 100 may travel based on information, data, or signals generated from a traveling system 710, a park-out system 740, and a park-in system.

If the vehicle 100 drives in the manual mode, the autonomous vehicle 100 may receive a user input for driving through a driving manipulation device 500. The vehicle 100 may travel based on the user input received through the driving manipulation device 500.

The overall length refers to the length of the vehicle 100 from the front to back of the vehicle 100, the width refers to the width of the vehicle 100, and the height refers to the distance from the bottom of wheels to the roof of the vehicle. In the description below, the overall-length direction L may indicate a direction in which measurement of overall length of the vehicle 100 is performed, the width direction W may indicate a direction in which measurement of width of the vehicle 100 is performed, and the height direction H may indicate a direction in which measurement of height of the vehicle 100 is performed.

As illustrated in FIG. 7, the vehicle 100 may include the UI device 200, the object detection device 300, the communication device 400, the driving manipulation device 500, a vehicle driving device 600, the operation system 700, a navigation system 770, a sensing unit 120, an interface unit 130, a memory 140, a controller 170, and a power supply 190.

In some embodiments, the vehicle 100 may further include a new component in addition to the components described in the present invention, or may not include a part of the described components.

The UI device 200 is used to enable the vehicle 100 to communicate with a user. The UI device 200 may receive a user input, and provide information generated from the vehicle 100 to the user. The vehicle 100 may implement UIs or User Experience (UX) through the UI device 200.

The UI device 200 may include an input unit 210, an internal camera 220, a biometric sensing unit 230, an output unit 250, and a processor 270.

In some embodiments, the UI device 200 may further include a new component in addition to components described below, or may not include a part of the described components.

The input unit 210 is provided to receive information from a user. Data collected by the input unit 210 may be analyzed by the processor 270 and processed as a control command from the user.

The input unit 210 may be disposed inside the vehicle 100. For example, the input unit 210 may be disposed in an area of a steering wheel, an area of an instrument panel, an area of a seat, an area of a pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert a voice input of the user to an electrical signal. The electrical signal may be provided to the processor 270 or the controller 170.

The voice input unit 211 may include one or more microphones.

The gesture input unit 212 may convert a gesture input of the user to an electrical signal. The electrical signal may be provided to the processor 270 or the controller 170.

The gesture input unit 212 may include at least one of an infrared (IR) sensor or an image sensor, for sensing a gesture input of the user.

In some embodiments, the gesture input unit 212 may sense a three-dimensional (3D) gesture input of the user. For this purpose, the gesture input unit 212 may include a light output unit for emitting a plurality of IR rays or a plurality of image sensors.

The gesture input unit 212 may sense a 3D gesture input of the user by Time of Flight (ToF), structured light, or disparity.

The touch input unit 213 may convert a touch input of the user to an electrical signal. The electrical signal may be provided to the processor 270 or the controller 170.

The touch input unit 213 may include a touch sensor for sensing a touch input of the user.

In some embodiments, a touch screen may be configured by integrating the touch input unit 213 with a display unit 251. The touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on the steering wheel, the center fascia, the center console, the cockpit module, a door, or the like.

The internal camera 220 may acquire a vehicle interior image. The processor 270 may sense a state of a user based on the vehicle interior image. The processor 270 may acquire information about the gaze of a user in the vehicle interior image. The processor 270 may sense the user's gesture in the vehicle interior image.

The biometric sensing unit 230 may acquire biometric information about a user. The biometric sensing unit 230 may include a sensor for acquiring biometric information about a user, and acquire information about a fingerprint, heart beats, and so on of a user, using the sensor. The biometric information may be used for user authentication.

The output unit 250 is provided to generate a visual output, an acoustic output, or a haptic output.

The output unit 250 may include at least one of the display unit 251, an audio output unit 252, or a haptic output unit 253.

The display unit 251 may display graphic objects corresponding to various kinds of information.

The display unit 251 may include at least one of a liquid crystal display (LCD), a thin film transistor-liquid crystal display (TFT LCD), an organic light-emitting diode (OLED) display, a flexible display, a 3D display, or an e-ink display.

The display unit 251 may form a layered structure together with the touch input unit 213 or be integrated with the touch input unit 213, thereby implementing a touchscreen.

The display unit 251 may be implemented as a head up display (HUD). In this case, the display unit 251 may be provided with a projection module, and output information by an image projected onto the windshield or a window.

The display unit 251 may include a transparent display. The transparent display may be attached to the windshield or a window.

The transparent display may display a specific screen with a specific transparency. To have a transparency, the transparent display may include at least one of a transparent Thin Film Electroluminescent (TFFL) display, a transparent OLED display, a transparent LCD, a transmissive transparent display, or a transparent LED display. The transparency of the transparent display is adjustable.

The UI device 200 may include a plurality of display units 251a to 251g.

The display unit 251 may be disposed in an area of the steering wheel, areas 251a, 251b, and 251e of the instrument panel, an area 251d of a seat, an area 251f of a pillar, an area 251g of a door, an area of the center console, an area of a head lining, or an area of a sun visor, or may be implemented in an area 251c of the windshield, and an area 251h of a window.

The audio output unit 252 converts an electrical signal received from the processor 270 or the controller 170 to an audio signal, and outputs the audio signal. To this end, the audio output unit 252 may include one or more speakers.

The haptic output unit 253 generates a haptic output. For example, the haptic output unit 253 may vibrate the steering wheel, a seat belt, a seat 110FL, 110FR, 110RL, or 110RR, so that a user may perceive the output.

The processor 270 may control an operation of each unit of the UI device 200.

In some embodiments, the UI device 200 may include a plurality of processors 270 or no processor 270.

If the UI device 200 does not include any processor 270, the UI device 200 may operate under control of a processor of another device in the vehicle 100, or under control of the controller 170.

The UI device 200 may be referred to as a vehicle display device.

The UI device 200 may operate under control of the controller 170.

The object detection device 300 is used to detect an object outside the vehicle 100. The object detection device 300 may generate object information based on sensing data.

The object information may include information indicating presence or absence of an object, information about the location of an object, information indicating the distance between the vehicle 100 and the object, and information about a relative speed of the vehicle 100 with respect to the object.

The object may be any of various objects related to driving of the vehicle 100.

Referring to FIGS. 5 and 6, the object O may include a lane OB10, another vehicle OB11, a pedestrian OB12, a two-wheeled vehicle OB13, a traffic signal OB14 and OB15, light, a road, a structure, a speed bump, a geographical feature, and an animal.

The lane OB10 may include a traveling lane, a lane next to the traveling lane, and a lane in which a vehicle is driving in the opposite direction. The lane OB10 may conceptually include left and right lines that define each of the lanes. The lane may conceptually include an intersection.

The other vehicle OB11 may be a vehicle traveling in the vicinity of the vehicle 100. The other vehicle OB11 may be located within a predetermined distance from the vehicle 100. For example, the other vehicle OB11 may precede or follow the vehicle 100.

The pedestrian OB12 may be a person located around the vehicle 100. The pedestrian OB12 may be a person located within a predetermined distance from the vehicle 100. For example, the pedestrian OB12 may be a person on a sidewalk or a roadway.

The two-wheel vehicle OB13 may refer to a transportation means moving on two wheels, located around the vehicle 100. The two-wheel vehicle OB13 may be a transportation means having two wheels, located within a predetermined distance from the vehicle 100. For example, the 2-wheel vehicle OB13 may be a motorcycle or bicycle on a sidewalk or a roadway.

The traffic signals may include a traffic signal lamp OB15, a traffic sign OB14, and a symbol or text drawn or written on a road surface.

The light may be light generated from a lamp of another vehicle. The light may be generated from a street lamp. The light may be sunlight.

The road may include a road surface, a curve, and a slope such as an uphill or downhill road.

The structure may be an object fixed on the ground, near to a road. For example, the structure may be any of a street lamp, a street tree, a building, a utility pole, a signal lamp, a bridge, a kerb, and a wall.

The geographical feature may include a mountain, a hill, and so on.

Objects may be classified into mobile objects and stationary objects. For example, the mobile objects may conceptually include another vehicle and a pedestrian. For example, the stationary objects may conceptually include a traffic signal, a road, a structure, another stationary vehicle, and a stationary pedestrian.

The object detection device 300 may include a camera 310, a Radio Detection and Ranging (RADAR) 320, a Light Detection and Ranging (LiDAR) 330, an ultrasonic sensor 340, an IR sensor 350, and a processor 370.

In some embodiments, the object detection device 300 may further include a new component in addition to components described below or may not include a part of the described components.

To acquire a vehicle exterior image, the camera 310 may be disposed at an appropriate position on the exterior of the vehicle 100. The camera 310 may be a mono camera, a stereo camera 310a, Around View Monitoring (AVM) cameras 310b, or a 360-degree camera.

The camera 310 may acquire information about the location of an object, information about a distance to the object, or information about a relative speed with respect to the object by any of various image processing algorithms.

For example, the camera 310 may acquire information about a distance to an object and information about a relative speed with respect to the object in an acquired image, based on a variation in the size of the object over time.

For example, the camera 310 may acquire information about a distance to an object and information about a relative speed with respect to the object through a pin hole model, road surface profiling, or the like.

For example, the camera 310 may acquire information about a distance to an object and information about a relative speed with respect to the object based on disparity information in a stereo image acquired by the stereo camera 310a.

For example, to acquire an image of the front view of the vehicle 100, the camera 310 may be disposed in the vicinity of a front windshield inside the vehicle 100. Alternatively, the camera 310 may be disposed around a front bumper or a radiator grille.

For example, to acquire an image of what lies behind the vehicle 100, the camera 310 may be disposed in the vicinity of a rear glass inside the vehicle 100. Or the camera 310 may be disposed around a rear bumper, a trunk, or a tail gate.

For example, to acquire an image of what lies on a side of the vehicle 100, the camera 310 may be disposed in the vicinity of at least one of side windows inside the vehicle 100. Alternatively, the camera 310 may be disposed around a side view mirror, a fender, or a door.

The camera 310 may provide an acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency Shift Keying (FSK) as a pulse RADAR scheme according to a signal waveform.

The RADAR 320 may detect an object in TOF or phase shifting by electromagnetic waves, and determine the location, distance, and relative speed of the detected object.

The RADAR 320 may be disposed at an appropriate position on the exterior of the vehicle 100 in order to sense an object ahead of, behind, or on a side of the vehicle 100.

The LiDAR 330 may include a laser transmitter and a laser receiver. The LiDAR 330 may be implemented in TOF or phase shifting.

The LiDAR 330 may be implemented in a driven or non-driven manner.

If the LiDAR 330 is implemented in the driven manner, the LiDAR 330 may be rotated by a motor and detect an object around the vehicle 100.

If the LiDAR 330 is implemented in a non-driven manner, the LiDAR 330 may detect an object within a predetermined range from the vehicle 100 by optical steering. The vehicle 100 may include a plurality of non-driven LiDARs 330.

The LiDAR 330 may detect an object in TOF or phase shifting by laser light, and determine the location, distance, and relative speed of the detected object.

The LiDAR 330 may be disposed at an appropriate position on the exterior of the vehicle 100 in order to sense an object ahead of, behind, or on a side of the vehicle 100.

The ultrasonic sensor 340 may include an ultrasonic wave transmitter and an ultrasonic wave receiver. The ultrasonic sensor 340 may detect an object by ultrasonic waves, and determine the location, distance, and relative speed of the detected object.

The ultrasonic sensor 340 may be disposed at an appropriate position on the exterior of the vehicle 100 in order to sense an object ahead of, behind, or on a side of the vehicle 100.

The IR sensor 350 may include an IR transmitter and an IR receiver. The IR sensor 350 may detect an object by IR light, and determine the location, distance, and relative speed of the detected object.

The IR sensor 350 may be disposed at an appropriate position on the exterior of the vehicle 100 in order to sense an object ahead of, behind, or on a side of the vehicle 100.

The processor 370 may control an overall operation of each unit of the object detection device 300.

The processor 370 may detect or classify an object by comparing data sensed by the camera 310, the RADAR 320, the LiDAR 330, the ultrasonic sensor 340, and the IR sensor 350 with pre-stored data.

The processor 370 may detect an object and track the detected object, based on an acquired image. The processor 370 may calculate a distance to the object, a relative speed with respect to the object, and so on by an image processing algorithm.

For example, the processor 370 may acquire information about a distance to an object and information about a relative speed with respect to the object from an acquired image, based on a variation in the size of the object over time.

For example, the processor 370 may acquire information about a distance to an object and information about a relative speed with respect to the object from an image acquired from the stereo camera 310*a*.

For example, the processor 370 may acquire information about a distance to an object and information about a relative speed with respect to the object from an image acquired from the stereo camera 310*a*, based on disparity information.

The processor 370 may detect an object and track the detected object based on electromagnetic waves which are transmitted, are reflected from an object, and then return. The processor 370 may calculate a distance to the object and a relative speed with respect to the object, based on the electromagnetic waves.

The processor 370 may detect an object and track the detected object based on laser light which is transmitted, is reflected from an object, and then returns. The sensing processor 370 may calculate a distance to the object and a relative speed with respect to the object, based on the laser light.

The processor 370 may detect an object and track the detected object based on ultrasonic waves which are transmitted, are reflected from an object, and then return. The processor 370 may calculate a distance to the object and a relative speed with respect to the object, based on the ultrasonic waves.

The processor 370 may detect an object and track the detected object based on IR light which is transmitted, is reflected from an object, and then returns. The processor 370 may calculate a distance to the object and a relative speed with respect to the object, based on the IR light.

In some embodiments, the object detection device 300 may include a plurality of processors 370 or no processor 370. For example, the camera 310, the RADAR 320, the LiDAR 330, the ultrasonic sensor 340, and the IR sensor 350 may include individual processors.

If the object detection device 300 includes no processor 370, the object detection device 300 may operate under control of a processor of a device in the vehicle 100 or under control of the controller 170.

The object detection device 300 may operate under control of the controller 170.

The communication device 400 is used to communicate with an external device. The external device may be another vehicle, a mobile terminal, or a server.

The communication device 400 may include at least one of a transmit antenna and a receive antenna, for communication, or a Radio Frequency (RF) circuit and device, for implementing various communication protocols.

The communication device 400 may include a short-range communication unit 410, a location information unit 420, a vehicle-to-everything (V2X) communication unit 430, an optical communication unit 440, a broadcasting transceiver unit 450, an intelligent transport system (ITS) communication unit 460, and a processor 470.

In some embodiments, the communication device 400 may further include a new component in addition to components described below, or may not include a part of the described components.

The short-range communication module 410 is a unit for conducting short-range communication. The short-range communication module 410 may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit 410 may conduct short-range communication between the vehicle 100 and at least one external device by establishing a wireless area network.

The location information unit 420 is a unit configured to acquire information about a location of the vehicle 100. The location information unit 420 may include at least one of a global positioning system (GPS) module or a Differential Global Positioning System (DGPS) module.

The V2X communication unit 430 is a unit used for wireless communication with a server (by vehicle-to-infrastructure (V2I)), another vehicle (by Vehicle to Vehicle (V2V)), or a pedestrian (by Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal to an optical signal and emitting the optical signal to the outside, and an optical receiver for converting a received optical signal to an electrical signal.

In some embodiments, the optical transmitter may be integrated with a lamp included in the vehicle 100.

The broadcasting transceiver unit 450 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and provide the received control signal to the controller 170 or a processor in the vehicle 100.

The processor 470 may control an overall operation of each unit of the communication device 400.

In some embodiments, the communication device 400 may include a plurality of processors 470 or no processor 470.

If the communication device 400 does not include any processor 470, the communication device 400 may operate under control of a processor of another device in the vehicle 100 or under control of the controller 170.

The communication device 400 may be configured along with the UI device 200, as a vehicle multimedia device. In this case, the vehicle multimedia device may be referred to as a telematics device or an Audio Video Navigation (AVN) device.

The communication device 400 may operate under control of the controller 170.

The driving manipulation device 500 is used to receive a user command for driving the vehicle 100.

In the manual mode, the vehicle 100 may travel based on a signal provided by the driving manipulation device 500.

The driving manipulation device 500 may include the steering input device 510, an acceleration input device 530, and a brake input device 570.

The steering input device 510 may receive a travel direction input for the vehicle 100 from a user. The steering input device 510 may take the form of a wheel to rotate to provide a steering input. In some embodiments, the steering input device 510 may be configured as a touch screen, a touchpad, or a button.

The acceleration input device 530 may receive an input for acceleration of the vehicle 100 from the user. The brake input device 570 may receive an input for deceleration of the vehicle 100 from the user. The acceleration input device 530 and the brake input device 570 are preferably formed into pedals. In some embodiments, the acceleration input device 530 or the brake input device 570 may be configured as a touch screen, a touchpad, or a button.

The driving manipulation device 500 may operate under control of the controller 170.

The vehicle driving device 600 is used to electrically control operations of various devices of the vehicle 100.

The vehicle driving device 600 may include at least one of a power train driving unit 610, a chassis driving unit 620, a door/window driving unit 630, a safety device driving unit 640, a lamp driving unit 650, or an air conditioner driving unit 660.

In some embodiments, the vehicle driving device 600 may further include a new component in addition to components described below or may not include a part of the components.

The vehicle driving device 600 may include a processor. Each unit of the vehicle driving device 600 may include a processor.

The power train driving unit 610 may control operation of a power train device.

The power train driving unit 610 may include a power source driver 611 and a transmission driver 612.

The power source driver 611 may control a power source of the vehicle 100.

For example, if the power source is a fossil fuel-based engine, the power source driver 611 may perform electronic control on the engine. Therefore, the power source driver 611 may control an output torque of the engine, and the like.

The power source driver 611 may adjust the engine output torque under control of the controller 170.

For example, if the power source is an electrical energy-based motor, the power source driver 611 may control the motor. The power source driver 611 may adjust a rotation speed, torque, and so on of the motor under control of the controller 170.

The transmission driver 612 may control a transmission.

The transmission driver 612 may adjust a state of the transmission. The transmission driver 612 may adjust the state of the transmission to drive D, reverse R, neutral N, or park P.

If the power source is the engine, the transmission driver 612 may adjust the engagement state of gears in the drive mode D.

The chassis driving unit 620 may control operation of a chassis device.

The chassis driving unit 620 may include a steering driver 621, a brake driver 622, and a suspension driver 623.

The steering driver 621 may perform electronic control on a steering device in the vehicle 100. The steering driver 621 may change a travel direction of the vehicle 100.

The brake driver 622 may perform electronic control on a brake device in the vehicle 100. For example, the brake driver 622 may decrease the speed of the vehicle 100 by controlling an operation of a brake disposed at a wheel.

The brake driver 622 may control a plurality of brakes individually. The brake driver 622 may control braking power applied to a plurality of wheels differently.

The suspension driver 623 may perform electronic control on a suspension device in the vehicle 100. For example, if the surface of a road is rugged, the suspension driver 623 may control the suspension device to reduce jerk of the vehicle 100.

The suspension driver 623 may control a plurality of suspensions individually.

The door/window driving unit 630 may perform electronic control on a door device or a window device in the vehicle 100.

The door/window driving unit 630 may include a door driver 631 and a window driver 632.

The door driver 631 may perform electronic control on a door device in the vehicle 100. For example, the door driver 631 may control opening and closing of a plurality of doors in the vehicle 100. The door driver 631 may control opening or closing of the trunk or the tail gate. The door driver 631 may control opening or closing of the sunroof.

The window driver 632 may perform electronic control on a window device in the vehicle 100. The window driver 632 may control opening or closing of a plurality of windows in the vehicle 100.

The safety device driving unit 640 may perform electronic control on various safety devices in the vehicle 100.

The safety device driving unit 640 may include an airbag driver 641, a seatbelt driver 642, and a pedestrian protection device driver 643.

The airbag driver 641 may perform electronic control on an airbag device in the vehicle 100. For example, the airbag driver 641 may control inflation of an airbag, upon sensing an emergency situation.

The seatbelt driver 642 may perform electronic control on a seatbelt device in the vehicle 100. For example, the seatbelt driver 642 may control securing of passengers on the seats 110FL, 110FR, 110RL, and 110RR by means of seatbelts, upon sensing a danger.

The pedestrian protection device driver 643 may perform electronic control on a hood lift and a pedestrian airbag. For example, the pedestrian protection device driver 643 may control the hood to be lifted up and the pedestrian airbag to be inflated, upon sensing collision with a pedestrian.

The lamp driving unit 650 may perform electronic control on various lamp devices in the vehicle 100.

The air conditioner driving unit 660 may perform electronic control on an air conditioner in the vehicle 100. For example, if a vehicle internal temperature is high, the air conditioner driver 660 may control the air conditioner to operate and supply cool air into the vehicle 100.

The vehicle driving device 600 may include a processor. Each unit of the vehicle driving device 600 may include a processor.

The vehicle driving device 600 may operate under control of the controller 170.

The operation system 700 is a system that controls various operations of the vehicle 100. The operation system 700 may operate in the autonomous driving mode.

The operation system 700 may include the traveling system 710, the park-out system 740, and the park-in system 750.

In some embodiments, the operation system 700 may further include a new component in addition to components described below or may not include a part of the described components.

The operation system 700 may include a processor. Each unit of the operation system 700 may include a processor.

In some embodiments, if the operation system 700 is implemented in software, the operation system 700 may lie under controller 170 in concept.

In some embodiments, the operation system 700 may conceptually include at least one of the UI device 200, the object detection device 300, the communication device 400, the driving manipulation device 500, the vehicle driving device 600, the navigation system 770, the sensing unit 120, or the controller 170.

The traveling system 710 may drive the vehicle 100.

The traveling system 710 may drive the vehicle 100 by providing a control signal to the vehicle driving device 600 based on navigation information received from the navigation system 770.

The traveling system 710 may drive the vehicle 100 by providing a control signal to the vehicle driving device 600 based on object information received from the object detection device 300.

The traveling system 710 may drive the vehicle 100 by receiving a signal from an external device through the communication device 400 and providing a control signal to the vehicle driving device 600.

Conceptually, the driving system 710 may be a system that includes at least one of the UI device 200, the object detection device 300, the communication device 400, the driving manipulation device 500, the vehicle driving device 600, the navigation system 770, the sensing unit 120, or the controller 170, and drives the vehicle 100.

The traveling system 710 may be referred to as a vehicle driving control device.

The park-out system 740 may perform park-out of the vehicle 100.

The park-out system 740 may perform park-out of the vehicle 100 by providing a control signal to the vehicle driving device 600 according to navigation information received from the navigation system 770.

The park-out system 740 may perform park-out of the vehicle 100 by providing a control signal to the vehicle driving device 600 based on object information received from the object detection device 300.

The park-out system 740 may perform park-out of the vehicle 100 by receiving a signal from an external device through the communication device 400 and providing a control signal to the vehicle driving device 600.

Conceptually, the park-out system 740 may be a system that includes at least one of the UI device 200, the object detection device 300, the communication device 400, the driving manipulation device 500, the vehicle driving device 600, the navigation system 770, the sensing unit 120, or the controller 170 and performs park-out of the vehicle 100.

The park-out system 740 may be referred to as a vehicle park-out control device.

The park-in system 750 may perform park-in of the vehicle 100.

The park-in system 750 may perform park-in of the vehicle 100 by providing a control signal to the vehicle driving device 600 according to navigation information received from the navigation system 770.

The park-in system 750 may perform park-in of the vehicle 100 by providing a control signal to the vehicle driving device 600 based on object information received from the object detection device 300.

The park-in system 750 may perform park-in of the vehicle 100 by providing a control signal to the vehicle driving device 600 according to a signal received from an external device via the communication device 400.

Conceptually, the park-in system 750 may be a system that includes at least one of the UI device 200, the object detection device 300, the communication device 400, the driving manipulation device 500, the vehicle driving device 600, the navigation system 770, the sensing unit 120, or the controller 170, and performs park-in of the vehicle 100.

The park-in system 750 may be referred to as a vehicle park-in control device.

The navigation system 770 may provide navigation information. The navigation information may include at least one of map information, set destination information, route information based on setting of a destination, information about various objects on a route, lane information, or information about a current location of a vehicle.

The navigation system 770 may include a memory and a processor. The memory may store navigation information. The processor may control operation of the navigation system 770.

In some embodiments, the navigation system 770 may receive information from an external device via the communication device 400 and update pre-stored information with the received information.

In some embodiments, the navigation system 770 may be classified as a lower-level component of the UI device 200.

The sensing unit 120 may sense a vehicle state. The sensing unit 120 may include an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tier sensor, a steering sensor for rotation of the steering wheel, an in-vehicle temperature sensor, an in-vehicle humidity sensor, an ultrasonic sensor, an illuminance sensor, an acceleration pedal position sensor, a brake pedal position sensor, and so on.

The inertial navigation unit (IMU) sensor may include one or more of an acceleration sensor, a gyro sensor, and a magnetic sensor.

The sensing unit 120 may acquire a sensing signal of vehicle position information, vehicle motion information, vehicle yaw information, vehicle roll information, vehicle pitch information, vehicle collision information, vehicle heading information, vehicle location information (GPS information), vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, a pressure applied to an accelerator pedal, a pressure applied to a brake pedal, and so on.

The sensing unit 120 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 120 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The interface unit 130 serves paths to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

The interface unit 130 may serve as a path along which electric energy is supplied to a connected mobile terminal. When the mobile terminal is electrically connected to the interface unit 130, the interface unit 130 may supply electric energy received from the power supply 190 to the mobile terminal under control of the controller 170.

The memory 140 is electrically connected to the controller 170. The memory 140 may store default data for a unit, control data for controlling the operation of the unit, and input and output data. The memory 140 may be any of various storage devices in hardware, such as read only memory (ROM), random access memory (RAM), erasable and programmable ROM (EPROM), flash drive, and hard drive. The memory 140 may store various data for an overall operation of the vehicle 100, such as programs for processing or control in the controller 170.

In some embodiments, the memory 140 may be integrated with the controller 170, or configured as a lower level component of the controller 170.

The controller 170 may control an overall operation of each unit in the vehicle 100. The controller 170 may be referred to as an electronic control unit (ECU).

The power supply 190 may supply power required for an operation of each component under control of the controller 170. In particular, the power supply 190 may receive power from a battery, etc. in the vehicle.

One or more processors and the controller 170, included in the vehicle 100, may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

Figure 8:
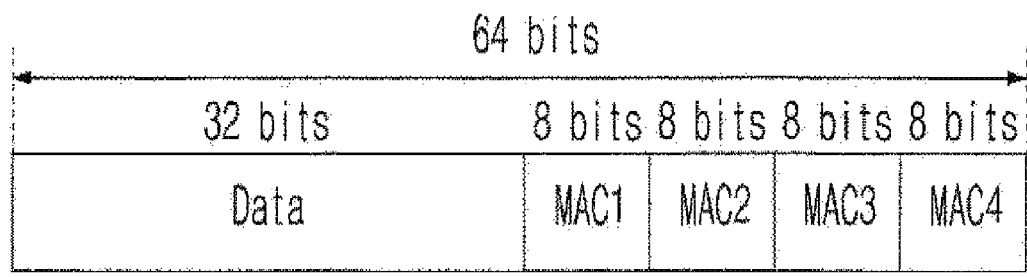
FIGS. 8 and 9 are diagrams for explanation of a communication system according to an embodiment of the present invention.
Figure 9:
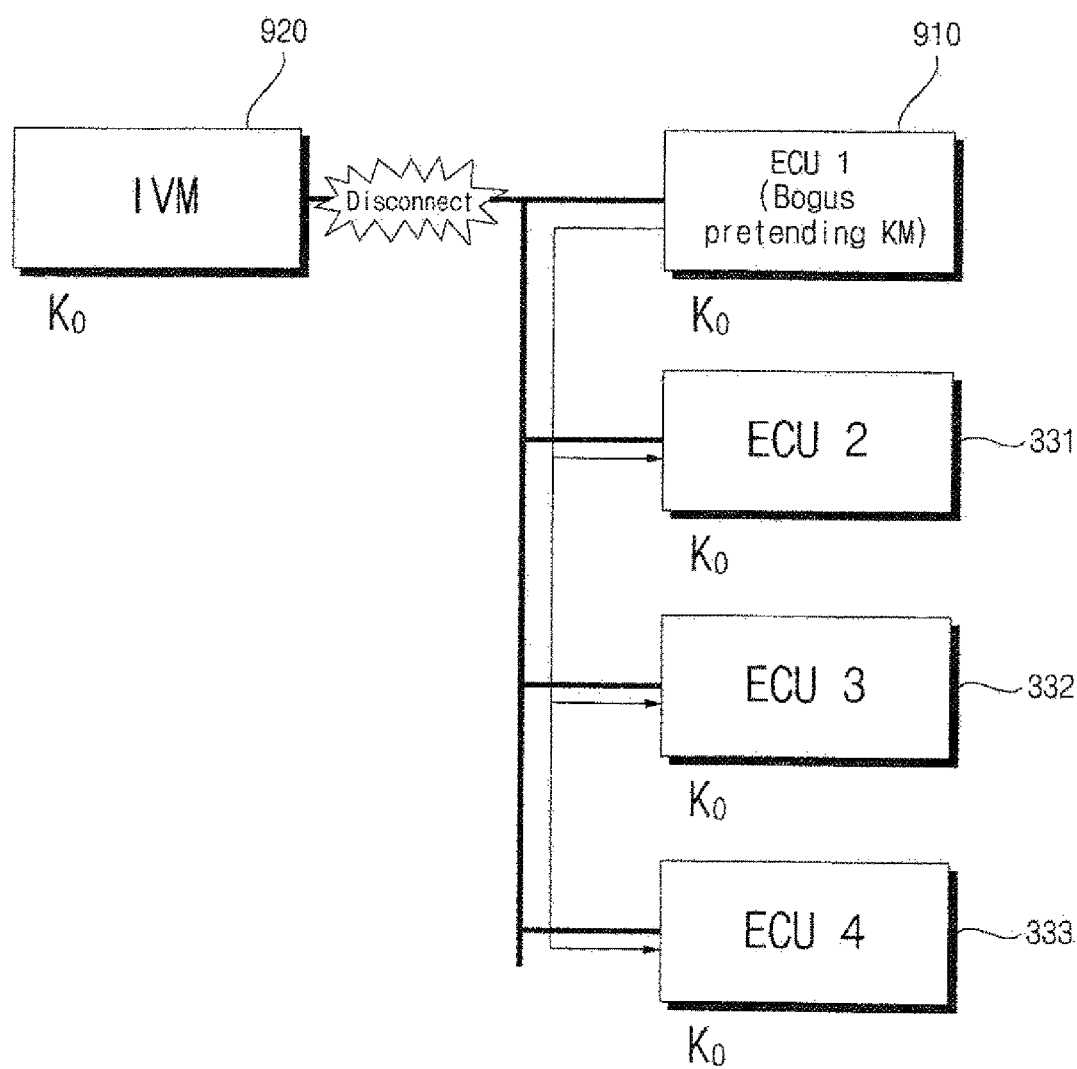

FIGS. 8 and 9 are diagrams for explanation of a communication system according to an embodiment of the present invention.

In a communication system 800, a plurality of electronic devices inside the vehicle 100 may be connected to each other through an in-vehicle network (IVN).

Each of the plurality of electronic devices may be referred to as an electronic control unit (ECU).

The in-vehicle network (IVN) may include a controller area network (CAN).

In the following description, the IVN of the vehicle 100 is assumed to be a CAN.

The CAN may employ a broadcast communication method of assigning a unique identification (ID) to a message itself without indication of a receiver 820 with respect to a sender 810.

A plurality of ECUs may receive the message ID, may check whether the message ID is a preset related ID, and may then receives a message assigned to the passed ID and may drop remaining messages.

The communication system 800 may embody an end-to-end communication method for communication between two ECUs only.

The communication system 800 may embody a group communication method for communication with three ECUs or more.

The communication system 800 may embody a global communication method for communication with all in-vehicle ECUs.

Recently, security has been an important issue, and for example, a malicious message is inserted into a CAN and then a vehicle is arbitrarily manipulated.

In order to provide a security function at a more strong level to an ECU, there has been a proposal or the like of installing a hardware security module (HSM) in the ECU.

An ECU provided in a vehicle needs to satisfy a minimum reference or more according to uses in consideration of the issue of cost rather than unconditionally providing high performance.

An authentication function has been the most important issue in security of a CAN, and it is not easy to find a solution to the security issue due to the above limitation.

There has been a proposal of use of message authentication code (MAC) via symmetric key-based cryptography in authentication between two ECUs.

A public key infrastructure (PKI)-based electronic signature scheme is an effective method for authentication in group or global communication in terms of a cryptologic aspect, but a PKI function is not capable of certainly being provided for a simple function due to the above cost issue.

Accordingly, a method of providing a group authentication function via a symmetric key-based method is proposed, but there is a problem in that insider attack occurs due to the basic disadvantage.

There have been various proposals for overcoming the problems, but there is still a problem such as high computing load or time delay. There is no safe method of checking who certainly transmits a corresponding message on a CAN bus.

An embodiment of the present invention proposes a broadcast authentication scheme of providing resistance to insider attack in a state in which computing load is minimized, as symmetric key-based technology.

ECUs may be connected through an IVN and the most commonly used IVN may be a CAN. The CAN may employ broadcast communication through a message ID instead of a particular transmission and reception address for a message. All ECUs may receive the message ID on a bus, may filter out a non-related message, and may then receive only a related message.

Synchronization in the IVN is one of the most important security issue (synchronization information is used for key renewal or the like). In the case of an ECU with a clock installed therein, the ECU may function as an in-vehicle manager (IVM) defined in the present technology. A clock may not be present in a plurality of ECUs. In this case, the IVM may broadcast a timestamp or the like for time synchronization.

The CAN may be capable of transmitting only maximum 64 bits (8 bytes) only in one frame (a packet in IT). This is a too small size in a situation in which a data security block having minimum 128 bits or more or 256 bits is recommend for a modern password.

Transmission of a timestamp or a counter as a plain text may be vulnerable to security, and thus, a message to be verified needs to be transmitted and there is a need for a solution when it is not possible to use a simple method using electronic signature.

Accordingly, when transmitting the timestamp or the counter to the ECU, the IVM needs to generate and transmit a MAC via symmetric key cryptography, which needs to prevent an intended action such as data forgery and alteration by a third malicious attacker.

There may be various proposals for group authentication methods using public key infrastructure (PKI), but it may be difficult to expect to use a hardware security module (HSM) of a Full EVITA grade, in which PKI is to be used, in all vehicular components in consideration of cost issue.

As exemplified in FIG. 8, authentication using a symmetric key may include a method of generating message authentication codes (MACs), adding the generated MACs to one frame, and transmitting the resulting data to respective reception ECUs.

This may be used in inter-group transmission, but may not be appropriate for transmission such as a global counter.

Authentication using a symmetric key may include a method using secure hardware extension (SHE). Here, a key master (which is the IVM according to the present technology) may broadcast a message authenticated through a symmetric key shared in a group. The key master may broadcast a counter and a MAC to a vehicular IVN, and all ECUs may examine the counter and the MAC through a group key.

However, this method may meet attack attempt by attackers outside the group, but may not block attack of insiders of the group.

As exemplified in FIG. 9, an ECU 1 910 having a malicious purpose may transmit a forged and altered message to each of ECUs 931, 932, and 933. Simultaneously, an actual key master (which is indicated by IVM) 920 may be blocked.

In addition, a method of configuring a trust group, sharing keys for respective groups related to a message ID, or the like may be vulnerable to insider attack in the same way.

The TESLA-based scheme proposed to be mainly used in WSN has been proposed, but there is a problem in terms of time delay of the TESLA scheme in the same way.

An embodiment of the present invention proposes an effective authentication scheme for minimizing offense against a malicious insider without an increase in overhead within a meaningful range.

Figure 10:
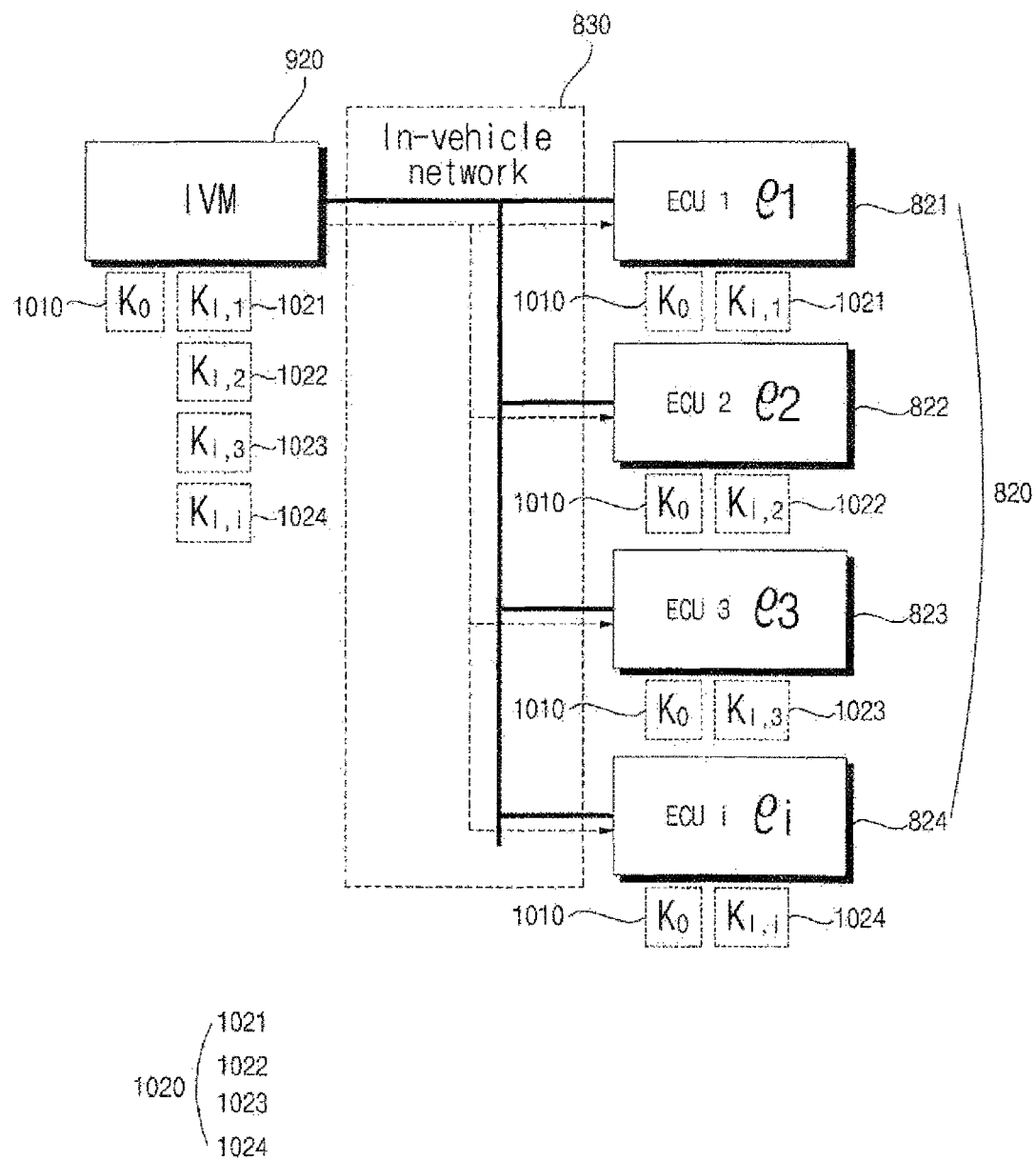
FIG. 10 is a diagram for explanation of a communication system according to an embodiment of the present invention.

FIG. 10 is a diagram for explanation of a communication system according to an embodiment of the present invention.

Figure 11:
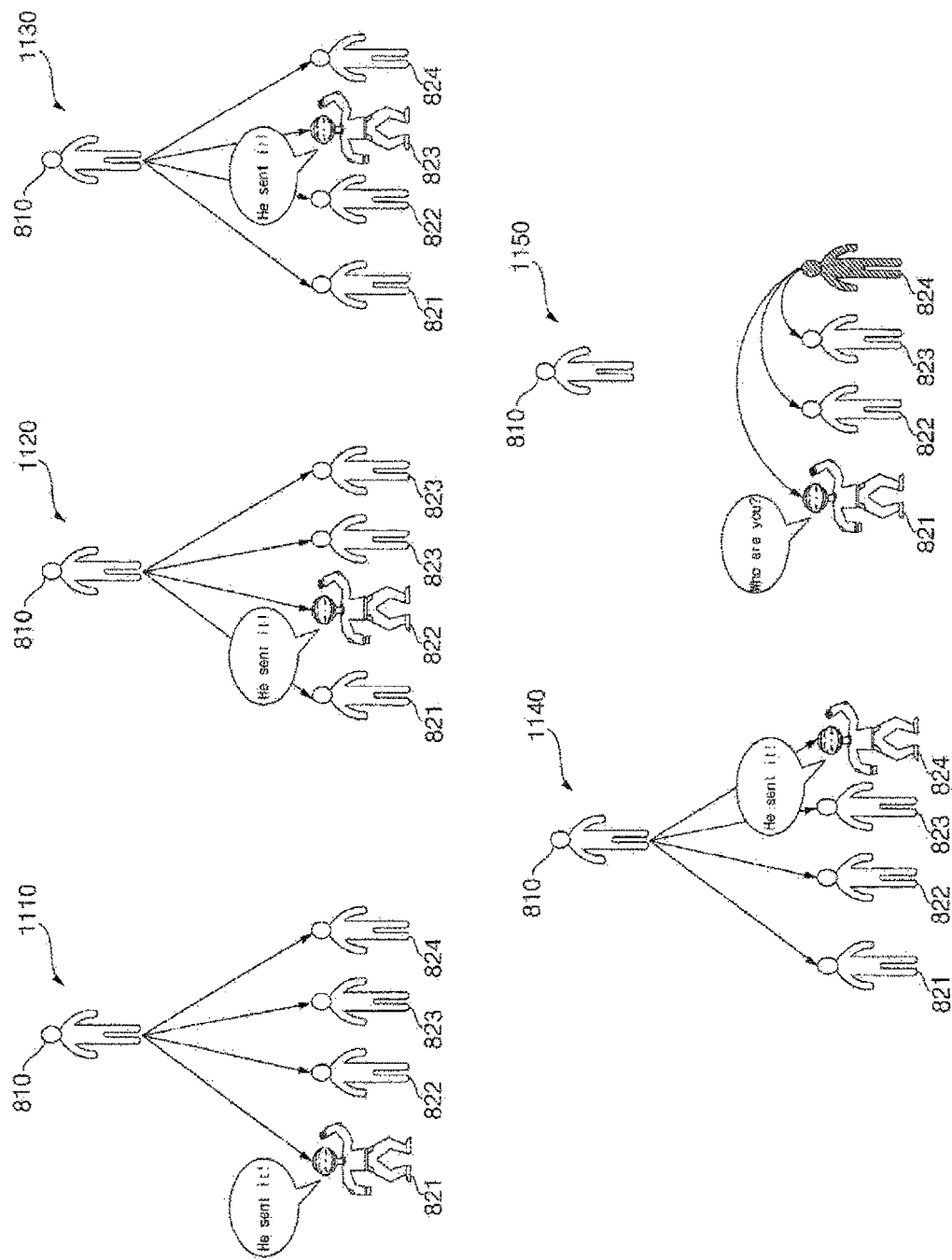
FIG. 11 is a diagram that conceptually shows a communication system according to an embodiment of the present invention.

FIG. 11 is a diagram that conceptually shows a communication system according to an embodiment of the present invention.

Referring to FIG. 8, the communication system 800 may be installed inside the vehicle 100.

The communication system 800 may be protected using a symmetric key cryptography method.

The communication system 800 may support communication between a plurality of electronic devices inside the vehicle 100.

The communication system 800 may include the sender 810, the plurality of receivers 820, and an in-vehicle network 830.

The sender 810 may transmit a message to a plurality of receivers 822.

The message may include a cyclic authentication code 1120 and a group authentication code 1110.

The cyclic authentication code 1120 may be referred to as a cyclic authentication key.

The group authentication code 1110 may be referred to as a group key.

The sender 810 may include at least one of a plurality of electronic devices included in the vehicle 100.

For example, the sender 810 may include at least one of the driving manipulation devices 500 for receiving a user input for vehicle driving.

The sender 810 may be referred to as an in-vehicle manager (IVM).

The sender 810 may include a clock. The sender 810 may transmit a timestamp.

In some embodiments, the sender 810 may function as a receiver.

A plurality of receivers 820 may receive a message.

The plurality of receivers 820 may verify the message.

The plurality of receivers 820 may separately verify the message based on the cyclic authentication code 1120 and the group authentication code 1110 at a preset order.

The plurality of receivers 820 may verify whether an error occurs in the message.

The plurality of receivers 820 may detect a malicious insider based on whether an error occurs.

Here, the malicious insider may be defined as an electronic device that transmits an unintended message in the vehicle 100 via hacking.

As described above, the communication system 800 may embody an end-to-end communication method, a group communication method, and a global communication method.

The group authentication code 1110 may be defined as data for verification of a message when the group communication method or the global communication method is embodied.

The global communication method may be understood as one of group communication methods.

In the case of the group communication method, the group authentication code 1110 may be shared by all electronic devices in a group.

The group authentication code 1110 may be shared between the sender 810 and the plurality of receivers 820.

The sender 810 and the plurality of receivers 820 may pre-store the group authentication codes 1110 having the same value.

The plurality of receivers 820 may verify the message based on whether the cyclic authentication code 1120 and the group authentication code 1110 are identical.

For example, in the case of the group communication method, the group authentication code 1110 may be shared by a sender and a plurality of receivers in the group. A receiver may verify the message based on whether the group authentication code 1110 of the received message and a pre-shared group authentication code 1110 are identical.

For example, in the case of the global communication method, the group authentication code 1110 may be shared by a sender and a plurality of receives in a vehicle. The receiver may verify the message based on whether the group authentication code 1110 of the received message and the pre-shared group authentication code 1110 are identical.

The plurality of receivers 820 may include a first receiver 821 and a second receiver 822.

When the sender 810 transmits a first message, each of the first receiver 821 and the second receiver 822 may receive the first message.

The first message may include a first cyclic authentication code 1021 and the group authentication code 1110.

The first cyclic authentication code 1021 may be shared between the sender 810 and the first receiver 821.

The sender 810 and the first receiver 821 may pre-store the first cyclic authentication codes 1021 having the same value.

The first cyclic authentication code 1021 may not be shared by other receivers except for the sender 810 and the first receiver 821.

The first cyclic authentication code 1021 may have a different value from a second cyclic authentication code 1022.

The first receiver 821 may verify the first message based on the first cyclic authentication code 1021 and the group authentication code 1110.

When the sender 810 transmits the second message, each of the first receiver 821 and the second receiver 822 may receive a second message.

The second message may include the second cyclic authentication code 1022 and the group authentication code 1110.

The second cyclic authentication code 1022 may be shared between the sender 810 and the second receiver 822.

The sender 810 and the second receiver 822 may pre-store the second cyclic authentication codes 1022 having the same value.

The second cyclic authentication code 1022 may not be shared in other receivers except for the sender 810 and the second receiver 822.

The second cyclic authentication code 1022 may have a different value from the first cyclic authentication code 1021.

The second receiver 822 may verify the second message based on the second cyclic authentication code 1022 and the group authentication code 1110.

The sender 810 may transmit the second message after transmitting the first message.

Upon detecting an error of a message, the plurality of receivers 820 may report error occurrence to the sender 810.

Upon detecting an error of the first message, the first receiver 821 may report error occurrence to the sender 810.

In this case, the sender 810 may transmit a message to the first receiver 821 using an end-to-end communication method. Upon receiving the first message using the end-to-end communication method, the first receiver 821 may re-verify the first message based on the first cyclic authentication code 1021 and the group authentication code 1110.

Upon detecting an error of the second message, the second receiver 822 may report error occurrence to the sender 810.

In this case, the sender 810 may transmit a message to the second receiver 822 using an end-to-end communication method. Upon receiving the second method using the end-to-end communication method, the second receiver 822 may re-verify the second message based on the second cyclic authentication code 1022 and the group authentication code 1110.

The plurality of receivers 820 may include the first receiver 821, the second receiver 822, a third receiver 823, and a fourth receiver 824.

The sender 810 may transmit a first message.

Each of the first receiver 821, the second receiver 822, the third receiver 823, and the fourth receiver 824 may receive the first message.

The first message may include the first cyclic authentication code and the group authentication code 1110.

Each of the first receiver 821 and the second receiver 822 may verify the first message based on the first cyclic authentication code and the group authentication code 1110. Here, the first cyclic authentication code may be shared by the sender 810, the first receiver 821, and the second receiver 822. The sender 810, the first receiver 821, and the second receiver 822 may pre-store first cyclic authentication codes having the same value.

The sender 810 may transmit the first message and may then transmit the second message.

Each of the first receiver 821, the second receiver 822, the third receiver 823, and the fourth receiver 824 may receive the second message.

The second message may include the second cyclic authentication code and the group authentication code 1110.

Each of the second receiver 822 and the third receiver 823 may verify the second message based on the second cyclic authentication code and the group authentication code 1110. Here, the second cyclic authentication code may be shared by the sender 810, the second receiver 822, and the third receiver 823. The sender 810, the second receiver 822, and the third receiver 823 may pre-store second cyclic authentication codes having the same value.

The plurality of receivers 820 may include a plurality of electronic devices included in the vehicle 100.

For example, the plurality of receivers 820 may be the vehicle driving device 600 for electrically controlling an in-vehicle driving device.

Each of the plurality of receivers 820 may verify the sender 810 based on verification of a message.

Each of the plurality of receivers 820 may determine whether the message is transmitted from an appropriate sender 810 based on whether the cyclic authentication code 1120 and the group authentication code 1110 are identical.

When the sender 810 is completely verified, each of the plurality of receivers 820 may operate based on data included in an assigned message.

Upon determining that the cyclic authentication code 1120 and the group authentication code 1110 are not identical, each of the plurality of receivers 820 may report error occurrence to the sender 810 and another receiver 820.

In some embodiments, any one of the plurality of receivers 820 may function as a sensor.

The in-vehicle network 830 may be embodied as an in-vehicle network (IVN).

For example, the in-vehicle network 830 may be embodied as a controller area network (CAN), FlexRay, and a local interconnect network (LIN).

The in-vehicle network 830 may be connected to the sender 810 and the receiver 820 and may be understood as a medium for transmitting a message.

The message may be a concept including a signal, data, and information.

The in-vehicle network 830 may use a wired or wireless method.

Hereinafter, the present invention will be described in terms of an operation performed by the communication system 800.

As exemplified in FIGS. 10 and 11, the sender 810 and the plurality of receivers 820 may form a group.

The plurality of receivers 820 may include the first receiver 821, the second receiver 822, the third receiver 823, and the fourth receiver 824.

The plurality of receivers 820 is exemplified to include four receivers, but the number of receivers may be less than 4 or may be equal to or greater than 5.

The sender 810 and the plurality of receivers 820 may exchange a message via group communication using the in-vehicle network 830 as a medium.

The sender 810 and the plurality of receivers 820 may exchange a message via global communication using the in-vehicle network 830 as a medium.

When the sender 810 transmits a message, the plurality of receivers 820 may sequentially verify the message. The plurality of receivers 820 may verify the sender 810 based on message verification.

When the sender 810 transmits the first message, the first receiver 821 may verify the sender 810 via verification of the first message (1110). Here, the first message may include data about an operation assigned to the first receiver 821.

When the sender 810 is completely verified, the first receiver 821 may perform an operation based on data included in the first message.

Then, when the sender 810 transmits the second message, the second receiver 822 may verify the sender 810 via verification of the second message (1120). Here, the second message may include data about an operation assigned to the second receiver 822.

When the sender 810 is completely verified, the second receiver 822 may perform an operation based on data included in the second message.

Then, when the sender 810 transmits a third message, the third receiver 823 may verify the sender 810 via verification of the third message (1130).

The third receiver 823 may verify a third message based on whether a third cyclic authentication code 1023 and the group authentication code 1110 are identical and may verify the sender 810 through verification of the third message.

Here, the third message may include data about an operation assigned to the third receiver 823.

Then, when the sender 810 transmits a fourth message, the fourth receiver 824 may verify the sender 810 through verification of a fourth message (1140).

The fourth receiver 824 may verify a fourth message based on whether a fourth cyclic authentication code 1024 and the group authentication code 1110 are identical and may verify the sender 810 through verification of the fourth message.

Here, the fourth message may include data about an operation assigned to the fourth receiver 824.

Upon receiving a fifth message from an insider (e.g., the fourth receiver 824) except for the sender 810, the first receiver 821 may verify the fifth message based on whether the first cyclic authentication code 1021 and the group authentication code 1110 are identical. When at least one of the first cyclic authentication code 1021 and the group authentication code 1110 is not identical, the first receiver 821 may recognize that the fifth message is not received from the sender 810 (1150). The first receiver 821 may report error occurrence to the sender 810 and another receiver 820.

Through such verification, the communication system 800 may block insider attack.

Figure 12:
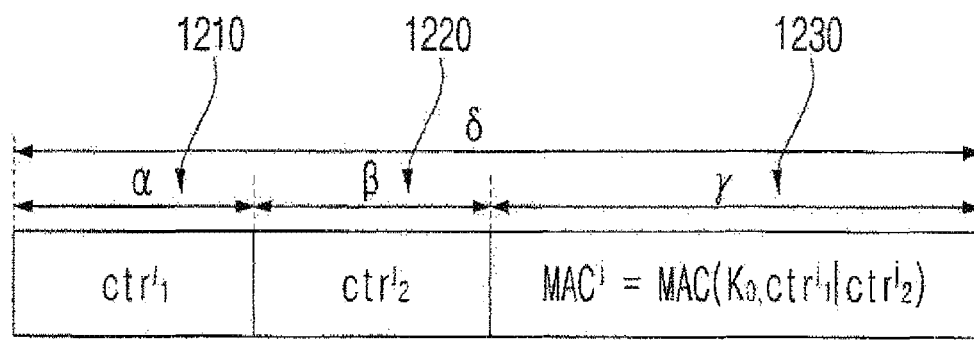
FIG. 12 is a diagram for explanation of a message according to an embodiment of the present invention.

FIG. 12 is a diagram for explanation of a message according to an embodiment of the present invention.

Referring to FIG. 12, the sender 810 may counter-broadcast (transmit) a counter number to the plurality of receivers 820 in order to synchronize the counter number.

A message 1200 may include a group counter 1210, a cyclic authentication code 1220, and a group authentication code 1230.

The group counter 1210 may be shared by the sender 810 in a group and the plurality of receivers 820.

The group counter 1210 may be initially set to 0 and then may be increased one by one.

In some embodiments, the group counter 1210 and the cyclic authentication code 1220 may be combined and used as a counter.

Generation of a counter may cause one result by receiving an arbitrary input value using a cryptologic unidirectional hash function.

Each of the sender 810 and the plurality of receivers 820 may share initial secret values of each cyclic authentication code.

When each of the plurality of receivers 820 verifies an initial message, a result value may be formed based on an initial secret value and may be compared with a cyclic authentication code.

Then, when each of the plurality of receivers 820 verifies a message, the receivers 820 may operate as follows.

i) Each of the plurality of receivers 820 may perform hash chaning using a previously used result value. A hash value may be pre-formed through a previous result value, the hash value may be compared with a received value (e.g., a cyclic authentication code included in a message), and the message may be immediately verified upon receiving the message.

ii) The sender 810 may transmit a frame about a counter (the group counter 1210, the cyclic authentication code 1220, and the group authentication code 1230) to the in-vehicle network 830.

iii) Each of the plurality of receivers 820 that receives the frame may verify the message through a group authentication code. Then, each of the plurality of receivers 820 may verify the message through the cyclic authentication code.

iv) When verification based on at least one of the group authentication code and the cyclic authentication code fails, a receiver that detects an error among the plurality of receivers 820 may perform reporting on the sender 810.

v) The receiver that detects an error may transmit an error message including counter information of a message in which the error occurs to the sender 810. The sender 810 may retransmit the message in which the error occurs to the receiver that detects the error.

The present invention may be implemented as code that can be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, an optical data storage, and a carrier wave (e.g., data transmission over the Internet). The computer may include a processor or a controller. The above embodiments are therefore to be construed in all aspects as illustrative and not restrictive. The scope of the present invention should be determined by the appended claims and their legal equivalents, not by the above description, and all changes coming within the meaning and equivalency range of the appended claims are intended to be embraced therein.

EXPLANATION OF REFERENCE NUMERALS

100: Vehicle
800: Communication system

What is claimed is:

1. A communication system between a plurality of in-vehicle electronic devices protected using a symmetric key method, the communication system comprising:
a sender configured to transmit a message including a cyclic authentication code and a group authentication code; and
a plurality of receivers configured to separately verify the message based on the cyclic authentication code and the group authentication code at a preset order, the plurality of receivers comprising a first receiver and a second receiver,
wherein the group authentication code is shared between the sender and each of the plurality of receivers,
wherein each of the first receiver and the second receiver is configured to:
receive a first message including a first cyclic authentication code and the group authentication code, and
receive a second message including a second cyclic authentication code and the group authentication code,
wherein the first receiver is configured to verify the first message based on the first cyclic authentication code and the group authentication code, and
wherein the second receiver is configured to verify the second message based on the second cyclic authentication code and the group authentication code.

2. The communication system of claim 1, wherein the sender is configured to transmit the second message after transmitting the first message.

3. The communication system of claim 2, wherein:
the first cyclic authentication code is shared between the sender and the first receiver; and
the second cyclic authentication code is shared between the sender and the second receiver.

4. The communication system of claim 3, wherein the first cyclic authentication code has a different value from the second cyclic authentication code.

5. The communication system of claim 1, wherein:
based on detecting an error of the first message, the first receiver is configured to report an error occurrence to the sender; and
the sender is configured to transmit the first message to the first receiver using an end-to-end communication method.

6. The communication system of claim 1, wherein:
the plurality of receivers further include a third receiver;
each of the first receiver, the second receiver, and the third receiver is configured to receive the first message;
each of the first receiver and the second receiver a is configured to verify the first message based on the first cyclic authentication code and the group authentication code; and
the first cyclic authentication code is shared between the sender, the first receiver, and the second receiver.

7. The communication system of claim 1, wherein:
the sender includes at least one of driving manipulation devices configured to receive a user input for driving; and
the plurality of receivers are a vehicle driving device configured to electrically control an in-vehicle driving device.

8. The communication system of claim 1, wherein each of the first receiver and the second receiver is configured to:
receive the first cyclic authentication code based on the sender transmitting the first message; and
receive the second cyclic authentication code based on the sender transmitting the second message.

9. The communication system of claim 1, wherein the first receiver is configured to verify the first message based on at least one of (i) comparing the first cyclic authentication code to a previously used first cyclic authentication code or (ii) comparing the group authentication code to a previously used group authentication code, and
wherein the second receiver is configured to verify the second message based on at least one of (i) comparing the second cyclic authentication code to a previously used second cyclic authentication code or (ii) comparing the group authentication code to the previously used group authentication code.

10. The communication system of claim 9, wherein the first receiver is configured to detect an error of the first message based on at least one of (i) a difference between the first cyclic authentication code and the previously used first cyclic authentication code or (ii) a difference between the group authentication code and the previously used group authentication code, and
wherein the second receiver is configured to detect an error of the second message based on at least one of a difference between the second cyclic authentication code and the previously used second cyclic authentication code or (ii) a difference between the group authentication code and the previously used group authentication code.

11. The communication system of claim 10, wherein the first receiver is configured to transmit information related to the error of the first message to the sender, and
wherein the second receiver is configured to transmit information related to the error of the second message to the sender.

* * * * *